M. T. CHAPMAN.
CRANK.
APPLICATION FILED DEC. 14, 1914.

1,186,547.

Patented June 13, 1916.

WITNESSES:
L. B. Graham
W. A. Furnner

INVENTOR
Matthew T. Chapman
By Adams & Jackson
Att'ys

UNITED STATES PATENT OFFICE.

MATTHEW T. CHAPMAN, OF AURORA, ILLINOIS, ASSIGNOR TO THE AMERICAN WELL WORKS, OF AURORA, ILLINOIS, A CORPORATION OF ILLINOIS.

CRANK.

1,186,547.  Specification of Letters Patent.  Patented June 13, 1916.

Original application filed September 30, 1911, Serial No. 652,062. Divided and this application filed December 14, 1914. Serial No. 877,158.

*To all whom it may concern:*

Be it known that I, MATTHEW T. CHAPMAN, a citizen of the United States, residing at Aurora, in the county of Kane and State of Illinois, have invented certain new and useful Improvements in Cranks, of which the following is a specification, reference being had to the accompanying drawings.

This invention relates to cranks, and has for its object the provision of a new and improved form and arrangement whereby a very compact and very strong structure is attained.

The preferred means by which I have accomplished my objects are illustrated in the accompanying drawings and are hereinafter specifically described. That which I believe to be new is set forth in the claims.

Figure 1:
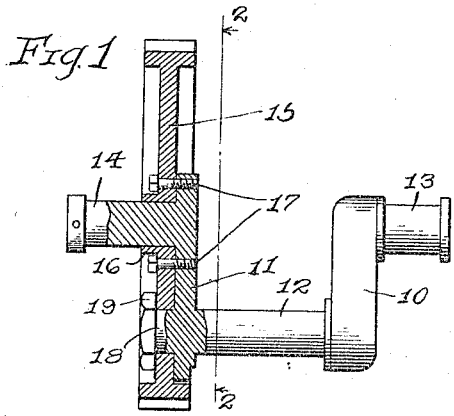
Figure 2:
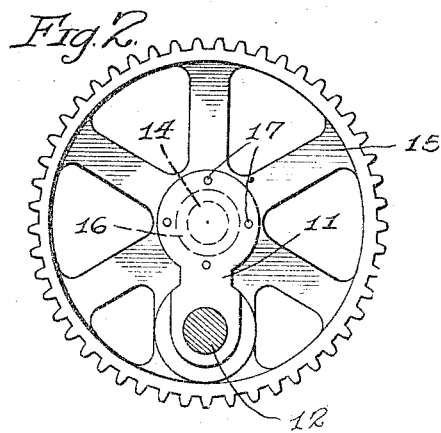
Figure 3:
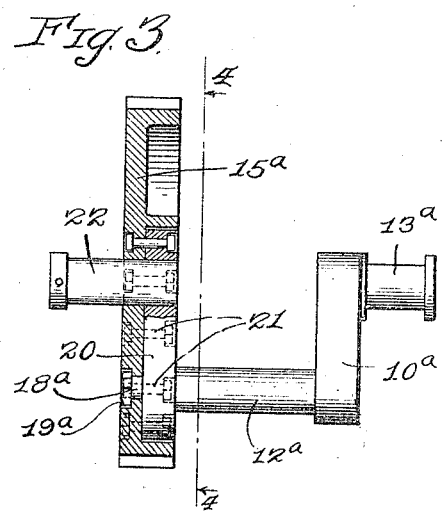
Figure 4:
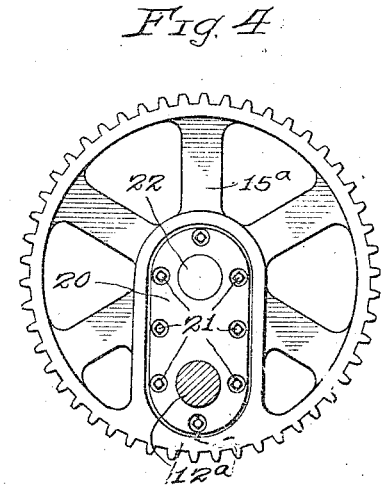

In the drawings,—Figure 1 is a view, partly in section, of my improved crank; Fig. 2 is a section taken at line 2—2 of Fig. 1; Fig. 3 is a view, partly in section, showing a slightly modified form; Fig. 4 is a section taken on line 4—4 of Fig. 3.

Referring to Figs. 1 and 2, 10—11 indicate crank-arms joined at their outer ends by a wrist-pin 12, and provided at their other ends with alined axles or supporting members 13—14, respectively, in the construction shown all of the parts so far referred to being made integral with each other. Mounted upon the crank-arm 11 in concentric position relative to the alined supporting members 13—14 and surrounding said arm 11 is a driving-gear 15, the hub 16 of which gear is mounted upon the supporting member 14. Bolts 17 are provided passing through suitable openings in the web of the gear and the crank-arm 11 for securing said gear firmly in position relative to the said arm 11. As best shown in Fig. 1, a stud 18 is provided, formed integrally with the arm 11 in alinement with the wrist-pin 12, passing through a suitably located opening through the gear 15, said stud being screw-threaded on its outer end and provided with a nut 19 for assisting in holding the gear in position.

In Figs. 3 and 4, which show a modification of the crank and gear, the corresponding parts are indicated by the same reference characters as in Figs. 1 and 2 but with the addition of an exponent "a." In the construction here shown, an arm 20 is provided broader than the arm 11 of the other construction and secured about its entire periphery by bolts 21 to the gear $15^a$. The concentrically-positioned support at that end of the shaft to which the gear $15^a$ is attached is made separate from the arm 20 in the form of an axle 22 which is keyed or otherwise fixed in position in suitable openings in the arm 20 and the gear $15^a$ in any approved manner. By this construction the assembling of the parts can be more readily accomplished.

By the expedient of mounting the driving means for the shaft surrounding or in transverse alinement with one of the crank-arms, I have provided not only a very strong construction but one also which has the maximum of compactness.

While I have shown only one driving gear mounted upon one of the crank-arms, it will be understood that I do not restrict myself to the use of a driving gear upon only one of the arms except as hereinafter specifically claimed, the important feature being that the driving means is located in transverse alinement with the arm.

This application is filed as a division of my application, Serial No. 652,062, pumping machinery, filed September 30, 1911.

That which I claim as my invention, and desire to secure by Letters Patent, is,—

1. A crank comprising in combination two crank-arms, a wrist connection between said arms, alined supports for said crank-arms, a stud projecting from the outer face of one of said crank-arms in alinement with the wrist, a gear mounted on said stud concentrically of the axis of rotation of said crank, and a nut secured by screw-threads upon said stud for holding the gear in position.

2. A crank comprising in combination two crank-arms, a wrist connection between said arms, a supporting member for one of said crank-arms, an axle mounted in a suitable opening in the other of said crank-arms in alinement with said supporting member, a stud projecting from the outer face of said last-mentioned crank-arm in alinement with said wrist, a gear mounted on said arm concentrically of the axis of rotation of said crank and having openings through which said stud and said axle project, and means for securing said gear in position upon said arm.

MATTHEW T. CHAPMAN.

Witnesses:
R. D. MAHAFFEY,
C. B. SPEIR.